United States Patent [19]

Shimizu et al.

[11] 4,363,900
[45] Dec. 14, 1982

[54] PROCESS FOR PREPARING POLYTETRAFLUOROETHYLENE FINE POWDER

[75] Inventors: Tetsuo Shimizu, Osaka; Shun Koizumi, Kawanishi, both of Japan

[73] Assignee: Daikin Kogyo Co., Ltd., Osaka, Japan

[21] Appl. No.: 268,835

[22] Filed: Jun. 1, 1981

[30] Foreign Application Priority Data

May 31, 1980 [JP] Japan ................................. 55-72930

[51] Int. Cl.$^3$ ............................................ C08F 114/18
[52] U.S. Cl. ...................................... 526/83; 428/402; 526/84; 526/255
[58] Field of Search .......................... 526/83, 84, 255; 428/402

[56] References Cited

U.S. PATENT DOCUMENTS 3,142,665  7/1964  Cardinal et al. ....................... 526/84
3,962,153  6/1976  Gore ..................................... 526/255

Primary Examiner—Harry Wong, Jr.
Attorney, Agent, or Firm—Birch, Stewart, Kolasch and Birch

[57] ABSTRACT

A process for preparing polytetrafluoroethylene fine powder by polymerization of tetrafluoroethylene in an aqueous medium comprising a water-soluble polymerization initiator and a non-telogenic surfactant capable of keeping colloidal polytetrafluoroethylene particles at a sufficiently stable state, characterized in that the polymerization is carried out at a temperature of 55° to 120° C., and a polymerization retarder chosen from aromatic hydroxy compounds, aromatic amino compounds and quinone compounds which has a water-solubility of not less than $2.5 \times 10^{-6}$ mol/liter at 25° C. and does not have any reinitiation ability after its addition or chain transfer to a free radical in the polymerization system is incorporated in the aqueous medium in an amount of 0.7 to 20 ppm at the stage after the initiation of the polymerization and after the consumption of at least 10% by weight of tetrafluoroethylene to be polymerized but before the consumption of 85% by weight of tetrafluoroethylene to be polymerized so that the polymerization time is extended at least 130% in comparison with that of the case wherein the polymerization is effected under the same conditions as above except not using the polymerization retarder, whereby colloidal polytetrafluoroethylene particles, of which the core portions occupying 50% by weight of the total weight of the finally produced particles have a specific gravity of not more than 2.210, of which the specific gravity of the finally produced particles is not more than that of the core portions and of which the average particle size is 0.1 to 0.5 μm, are obtained.

6 Claims, No Drawings

PROCESS FOR PREPARING POLYTETRAFLUOROETHYLENE FINE POWDER

The present invention relates to a process for preparing polytetrafluoroethylene fine powder.

Polytetrafluoroethylene (hereinafter referred to as "PTFE") fine powder is usually processed by the paste extrusion method to make electric wire coatings, tubes, tapes, films, pipes, etc. Depending upon the use and the processing conditions, various kinds of PTFE fine powder have been provided and are employed effectively. For the extrusion processing, for instance, PTFE fine powder is incorporated with a lubricating aid to make dough blocks, which are charged in a cylinder of an extruder and extruded through a small nozzle. In order to make possible the extruding at a high reduction ratio (i.e. the ratio of the section of the nozzle to the section of the cylinder), PTFE fine powder is widely used prepared by the process as disclosed in Japanese Patent Publn. (examined) No. 4643/1962 or Japanese Patent Publn. (unexamined) No. 36291/1976. Further, certain kinds of PTFE fine powder exert excellent performances as seal tapes for joint portions.

In recent years, the application of PTFE to the manufacture of porous materials has gained popularity, and there have been developed some manufacturing methods. Among them, a typical one is the manufacture of a porous material having a matrix tensile strength of not less than 514 kg/cm$^2$ by stretching a paste-extruded product of PTFE fine powder without sintering at a stretching rate of not less than 10%/sec. (cf. Japanese Patent Publn. (examined) No. 18991/1976). This method is based on the discovery of a quite peculiar property of an unsintered paste-extruded product of PTFE fine powder that it can be stretched to a great extent without cutting when the stretching is carried out at an elevated temperature with an extremely high stretching rate. The stretched PTFE product is porous, has a high strength in a stretching direction and shows a low apparent density. It is used as a porous material as such or after sintering.

As described in Japanese Patent Publn. (examined) No. 18991/1976, an unsintered paste-extruded product of PTFE fine powder can be stretched to a higher extent without cutting when the stretching is effected at a higher temperature with a higher stretching rate. In fact, the stretching rate as actually applied reaches to a maximum rate of 5,000 to 40,000%/sec. Stretchability (i.e. a property indicating a product can be stretched without cutting to give an evenly porous product) is varied with the starting PTFE fine powder. For instance, modified PTFE fine powder obtained by the process as disclosed in Japanese Patent Publn. (examined) No. 4643/1962 is inferior in stretchability so that the application of a higher temperature and a higher stretching rate is necessary for preparation of a porous product. Also, PTFE fine powder having a higher crystallinity tends to show a better stretchability. When the starting PTFE fine powder is subjected to heat treatment at a temperature higher than 200° C. and lower than the melting point prior to the extrusion, the stretchability is significantly increased.

Further, Japanese Patent Publn. (unexamined) No. 60979/1978 discloses PTFE fine powder which has an average molecular weight of not less than 5,000,000, a coefficient of non-crystallinity of not more than 0.1 and a number average primary particle diameter of 0.1 to 0.4 micron and shows, in the differential thermal analysis chart according to a differential scanning calorimeter, a sharp peak at a temperature of 347°±2° C. without any definite peak or shoulder between 330° C. and the said temperature for the sharp peak. This PTFE fine powder has a good stretchability but is still somewhat difficult in attaining uniform stretching.

A main object of the present invention is to embody a process for preparing PTFE fine powder having excellent stretchability. Another object of this invention is to embody a process for preparing PTFE fine powder which can provide a shaped product having excellent mechanical strength. These and other objects of the invention will be apparent to those skilled in the art from the foregoing and subsequent descriptions.

According to the present invention, there is provided a process for preparing PTFE fine powder by polymerization of tetrafluoroethylene in an aqueous medium including a water-soluble polymerization initiator and a non-telogenic surfactant capable of keeping colloidal PTFE particles at a sufficiently stable state, characterized in that the polymerization is effected at a temperature of 55° to 120° C., a polymerization retarder chosen from aromatic hydroxy compounds, aromatic amino compounds and quinone compounds which has a water-solubility of not less than $2.5 \times 10^{-6}$ mol/liter at 25° C. and does not have any reinitiation ability after its addition or chain transfer to a free radical in the polymerization system is incorporated in the aqueous medium in an amount of 0.7 to 20 ppm at the stage after the initiation of the polymerization and after the consumption of at least 10% by weight of tetrafluoroethylene to be polymerized but before the consumption of 85% by weight of tetrafluoroethylene to be polymerized so that the polymerization time is extended at least 130% in comparison with that of the case wherein the polymerization is effected under the same conditions as above except not using the polymerization retarder, whereby colloidal PTFE particles, of which the core portions occupying 50% by weight of the total weight of the finally produced particles have a specific gravity of not more than 2.210, of which the specific gravity of the finally produced particles is not more than that of the core portions and of which the average particle size is 0.1 to 0.5 μm, are obtained.

One of the typical procedures for carrying out the process of this invention starts with charging into a stainless steel or glasslined autoclave equipped with an agitator deoxygenated and deionized water, a surfactant capable of keeping colloidal PTFE particles at a sufficiently stable state and, optionally, a saturated hydrocarbon of not less than 12 carbon atoms which is a substantially inert liquid under the reaction condition and can keep the latex stable during the polymerization, replacing the atmosphere in the autoclave by an inert gas and pressurizing tetrafluoroethylene into the autoclave until a desired inner pressure, usually from 5 to 40 kgf/cm$^2$, is obtained. Then, the polymerization system is kept at a temperature required for polymerization so that polymerization is initiated. The polymerization is effected with continuous addition of tetrafluoroethylene to the polymerization system until 15 to 45% by weight of PTFE to the weight of the aqueous medium is produced. After the polymerization is completed, the produced latex is coagulated, and the coagulated product is collected, washed and dried to give PTFE fine powder.

As the surfactant, there may be used any fluorine-containing surfactant chosen from the acids of the formulas: $X(CF_2)_mCOOH$ (wherein X is hydrogen, chlorine or fluorine and m is an integer of 6 to 12), $Cl(CF_2CFCl)_nCF_2COOH$ (wherein n is an integer of 2 to 6) and $C_pF_{2p+1}SO_3H$ (wherein p is an integer of 5 to 9), and their salts. The amount of the surfactant may be usually from 0.01 to 0.5% by weight on the basis of the weight of the aqueous medium.

As the polymerization initiator, there may be used a water-soluble persulfate conventionally employed for obtaining an aqueous dispersion of colloidal PTFE particles, or its combination with an appropriate reducing agent as the redox system. The polymerization initiator is preferred to be used in a relatively low concentration. For instance, ammonium persulfate is ordinarily used in a concentration of not more than 0.004% by weight, preferably of not more than 0.002% by weight, to the weight of the aqueous medium at a polymerization temperature of 70° C. The use of the polymerization initiator at such low concentration is advantageous for production of a high molecular weight of PTFE fine powder, which has a good stretchability.

When an aqueous dispersion of colloidal PTFE particles is produced in an aqueous medium comprising a surfactant and a polymerization initiator, the molecular weight of PTFE is increased with the progress of the polymerization, unless a chain transfer agent lowering the molecular weight is present in the polymerization system. This is because the termination reaction rate of the polymer radical is markedly small and the living-like reaction proceeds. Accordingly, in the polymerization using a polymerization initiator at a suitably low concentration, there can be produced PTFE of considerably high molecular weight without incorporation of a polymerization retarder, as hereinafter explained, into the polymerization system. Even at the stage where only a half amount of tetrafluoroethylene to be polymerized has been consumed, the number average molecular weight exceeds 2,500,000 (a number average molecular weight of 2,500,000 corresponding to a specific gravity of about 2.210).

One of the characteristic features of this invention is to effect the polymerization at a temperature usually from 55° to 120° C., preferably from 60° to 85° C. When the temperature is lower than the lower limit, the polymerization rate is too small, and the process is disadvantageous from the economical viewpoint. In addition, the stretchability of the product is inferior. When the temperature is higher than the higher limit, the decomposition rate of the polymerization initiator is too large so that its continuous addition is made necessary. Further, the monomer concentration in the autoclave is lowered, and an unfavorable influence is given on the polymerization rate.

Another characteristic feature of the invention is the incorporation of a polymerization retarder into the polymerization system at a certain specific stage. Namely, the addition of a polymerization retarder after the formation of the nuclei for the particles, i.e. after the consumption of tetrafluoroethylene in an amount of at least 10% by weight on the basis of the total weight of tetrafluoroethylene used, is recommended. However, the addition after the consumption of 85% by weight of tetrafluoroethylene can hardly afford PTFE fine powder having a good stretchability. Thus, the addition at the stage where 15 to 80% by weight of tetrafluoroethylene is consumed is preferred. When a polymerization retarder is incorporated into the polymerization system before the consumption of less than 10% by weight, the polymerization rate is markedly lowered so that the continuous proceeding of the polymerization is hardly possible. Especially when the incorporation is made prior to the initiation of the polymerization, the initiation of the polymerization itself becomes difficult. To the contrary, the incorporation after consumption of 10% by weight or more of tetrafluoroethylene results in that the polymerization proceeds continuously to the consumption of the total weight of tetrafluoroethylene to the same extent as the case wherein the polymerization retarder is not incorporated, though the reaction rate lowers gradually.

A further characteristic feature of the invention is to extend the polymerization time to a certain extent, i.e. not less than 130%, preferably not less than 20%, in comparison with the case wherein a polymerization retarder is not incorporated. As stated above, the presence of a polymerization retarder in the polymerization system is as such effective in more or less extending the polymerization time. In order to achieve the extension to the extent as stated above, however, the use of a certain specific polymerization retarder in a certain specific amount is needed. Thus, the use of a polymerization retarder chosen from a group of compounds as hereinafter explained, usually in an amount of at least 20 mol % to the molar weight of the polymerization initiator, is essential in the invention. The said amount ordinarily corresponds to a concentration of 0.7 to 20 ppm to the weight of the aqueous medium in the polymerization system. The extension of the polymerization time is disadvantageous from the economical viewpoint, but such a disadvantage can be practically overcome by suitable selection of other reaction conditions such as monomer concentration, polymerization pressure and agitation speed so as to shorten the polymerization time.

The polymerization retarder to be used in this invention may be an organic compound which can undertake a chain transfer reaction easily with a primary radical or a growing radical to make a radical which does not react further with the monomer or undertake an addition reaction to a primary radical or a growing radical to make a stable radical. Examples of such polymerization retarders are aromatic hydroxy compounds such as phenol, naphthols (e.g. β-naphthol), nitrophenols (e.g. o-, m- or p-nitrophenol), p-nitrosophenol, aminophenols (e.g. o-, m- or p-aminophenol), polyhydric phenols (e.g. catechol, resorcinol, hydroquinone, pyrogallol, phloroglucinol, naphthoresorcinol), salicylic acids (e.g. salicylic acid, m- or p-salicylic acid) and gallic acid, aromatic amino compounds such as phenylenediamines (e.g. o-, m- or p-phenylenediamine) and benzidine, and quinone compounds such as benzoquinones (e.g. o- or p-benzoquinone), naphthoquinones (e.g. 1,4-naphthoquinone) and alizarin.

The polymerization retarder usable in this invention is required to have a certain solubility in water, i.e. a water solubility of at least $2.5 \times 10^{-6}$ mol/liter at 25° C. While a great number of compounds are included in the category of aromatic hydroxy compounds, aromatic amino compounds and quinone compounds, the ones to be usable in this invention should have the said water-solubility, because they are required to contact with the radicals.

Chain transfer agents are generally characterized by their chain transfer constant and reinitiation efficiency. Among them, the ones having a reinitiation efficiency of nearly 0% are called "polymerization retarders". The polymerization retarders usable in this invention also should have a reinitiation efficiency of substantially 0%.

In the emulsion polymerization of tetrafluoroethylene, the presence of a chain transfer agent such as methanol, carbon tetrachloride, propane or propionic acid can afford PTFE fine powder improved in extrusion property in paste (cf. Japanese Patent Publn. (examined) No. 4643/1962). However, the chain transfer agent used therein is clearly differentiated from the polymerization retarder usable in this invention in having a capability of reinitiation of the polymerization, and the PTFE fine powder obtained in such process is much inferior in stretchability. In fact, in the process of this invention, the particle size is increased due to the presence of a polymerization retarder, and the formation of the core portions having a high crystallinity tends to be promoted. In the said conventional process, this tendency is rather prevented.

One of the characteristic properties of the PTFE fine powder prepared by the process of the invention is that the specific gravity of the core portions of the particles is not more than 2.210, the specific gravity of the finally produced particles is smaller than that of the core portions and the average particle size is from 0.1 to 0.5 μm.

As to the molecular weight of the PTFE fine powder, the following relationship is present (cf. Japanese Patent Publn. (examined) No. 4643/1962):

$$\overline{M}ns/\overline{M}nc = 2\overline{M}n/\overline{M}nc - 1$$

wherein $\overline{M}n$ is the number average molecular weight of the finally produced polymer, $\overline{M}nc$ is the molecular weight determined on the polymer obtained at the stage that 50% by weight of the total weight of tetrafluoroethylene to be polymerized has been consumed and $\overline{M}ns$ can be derived from $\overline{M}n$ and $\overline{M}nc$. On the other hand, the specific gravity of the powder is inversely proportional to the specific gravity of the polymer, and therefore the characteristic feature of the PTFE fine powder of the invention may be representable by the formula: $\overline{M}ns/\overline{M}nc > 1$. As the result of the experimental study, however, the powder obtained by the process of the invention indicates $\overline{M}ns/\overline{M}nc > 2.0$. Rather, the polymer satisfying this relationship shows an excellent stretchability. Thus, the possession of the above properties is required for PTFE fine powder to show an even stretchability.

In addition to the above characteristics, the PTFE fine powder of the invention has usually a heat absorption ratio of not more than 0.3, preferably not more than 0.27, in the differential thermal analysis chart according to a differential scanning calorimeter as described in Japanese Patent Publn. (unexamined) No. 60979/1978, a half value width of heat absorption peak of not more than 6 deg, preferably not more than 5.5 deg, an average molecular weight of not more than 5,000,000 and a coefficient of non-crystallinity of not more than 0.1. These properties are required for carrying out the paste-extrusion of PTFE fine powder under industrially acceptable conditions such as a relatively low temperature and a relatively low extrusion rate.

In the present specification, the specific gravity (S.G.) of the PTFE fine powder has the following relationship with the number average molecular weight ($\overline{M}n$):

$$\log_{10}\overline{M}n = 28.04 - 9.790 \times (S.G.)$$

and may be determined by the following procedure: PTFE fine powder (5 g) is compressed in a mold having a round section of 32 mm in diameter under a pressure of 200 kg/cm$^2$ in an atmosphere at 23° to 25° C.; the compressed product is taken out from the mold and sintered in an air furnace at 380° C. for 30 minutes, followed by cooling to 300° C. at a cooling rate of 70° C./hour; and the cooled product is taken out from the furnace and allowed to cool at room temperature. The ratio of the weight of the thus obtained product in the air to the weight of water having the same volume as the said product at 23° C. is the S.G. value.

The A.I. value is intended to represent the value obtained by dividing the absorbance at a wavelength of 778 cm$^{-1}$ in the infrared absorption spectrum of the polymer by the absorbance at a wavelength of 2367 cm$^{-1}$.

The average particle size of colloidal PTFE particles is indicated by the value determined indirectly from the transmittance of incident light of 550 nm per unit length of a dilute aqueous dispersion of colloidal PTFE particles having a solid content of 0.02% by weight on the basis of the calibration curve between the said transmittance and the average particle size determined by the electron microscopic observation.

The PTFE fine powder prepared by the process of this invention may be subjected to various after-treatments such as heat treatment at a temperature below 300° C., kneading as disclosed in Japanese Patent Publn. (examined) No. 4657/1971 and grinding. By these treatments, no material difference is produced on the differential thermal analysis chart but stretchability is more improved.

The PTFE fine powder of the invention may be incorporated with various additives such as glass fiber, carbon powder, graphite powder and inorganic pigment. Such incorporation is preferred to be effected on the step for coagulation of the aqueous dispersion of colloidal PTFE particles obtained by the polymerization. The resulting PTFE fine powder containing the said additives also shows a good stretchability.

Practical and presently preferred embodiments of the invention are illustratively shown in the following Examples wherein % used for the expression of the concentration and the weight proportion indicates % by weight, unless otherwise indicated.

The extrusion test and the stretching test were carried out in the following ways:

Extrusion test:

PTFE fine powder (100 parts by weight) is admixed with an extrusion aid "Isopar E" (20 parts by weight) at room temperature, and the resultant mixture is stored in a sealed container for 12 to 24 hours. The said mixture is extruded at room temperature by the use of an extrusion mold having a cylinder of 25.4 mm in diameter, a die angle of 30°, a nozzle diameter of 2.54 mm and a nozzle length of 7 mm with a ram speed of 20 mm/min to make a strand, during which the extrusion pressure at equilibrium is recorded. The strand is then dried.

Stretching test:

The sample obtained by cutting the said strand is stretched in a draw ratio of 30 at 310° C. with a distance between chucks of 50 mm under a pulling rate of 100%/sec or 1000%/sec. The sample, which can be stretched in 30 times under 100%/sec, shows no cut on stretching under 1000%/sec. The sample, which is cut by stretching under 1000%/sec, is also cut in stretching under 100%/sec. If the cut is not produced, the stretched product is divided into the one in an even state and the one in an uneven state. The sample having the best stretchability is the one giving an even appearance without cut on stretching under 100%/sec. The next is the one giving an uneven appearance without cut on stretching under 100%/sec. The sample producing cut on stretching is judged as "not acceptable".

The polymer prepared by the process of this invention produces no cut even if an uneven appearance is given on stretching with 100%/sec and affords an even appearance on stretching with 1000%/sec.

EXAMPLE 1

Into a 3 liter-volume glasslined autoclave equipped with an anchor type agitator, deionized and deoxygenated water (1.5 liters), paraffin wax (M.P., 56° C.) (60 g) and ammonium perfluorooctanoate (1.5 g) were charged, the atmosphere was replaced by nitrogen gas and then tetrafluoroethylene gas at 70° C., and tetrafluoroethylene was pressurized to make an inner pressure of 9.0 kgf/cm$^2$. The contents were agitated by the agitator at 400 rpm/min, and ammonium persulfate (hereinafter referred to as "APS") (10 mg) was added thereto, whereby the polymerization started. Tetrafluoroethylene was continuously supplied to the autoclave through a pressure-reducing valve controlled at 9.0 kgf/cm$^2$. The reaction rate during the polymerization, i.e. the consumption rate of the monomer and the consumed amount of the monomer, was indicated by a flow meter and an integrating flow meter provided between the pressure-reducing valve and the autoclave, and the instantaneous flow amount was recorded by the analog output. When the consumed amount of tetrafluoroethylene after the addition of APS reached 168 g, hydroquinone was charged therein in an amount of 2 ppm to the aqueous medium, i.e. 3 mg. When expressed by the consumed weight of tetrafluoroethylene per unit volume of the aqueous medium and unit time, the reaction rate was 108 g (hereinafter referred to as "108 g.l$^{-1}$.hr$^{-1}$"). At the stage that 201 g of the monomer was consumed, about 60 ml of the content was sampled and used for determination of $\overline{M}nc$. When 402 g of the monomer was consumed, the reaction was finished by stopping the agitation and the supply of the monomer, and the remaining monomer was released.

The reaction rate at the stage that the reaction was finished was 8.85 g.l$^{-1}$.hr$^{-1}$, which was lowered to 1/12 that at the stage when hydroquinone was added. The stage at which hydroquinone was added was 42% (168/402×100) in the consumption of tetrafluoroethylene, the total reaction time was 12.0 hours, and the average particle size was 0.249 μm. The obtained PTFE dispersion was coagulated and washed, followed by drying at 150° C. for 16 hours to give PTFE fine powder. The specific gravity of the powder was 2.171, and the specific gravity of the sample taken in the course of polymerization was 2.191. Therefore, $\overline{M}ns/\overline{M}nc$ could be calculated to be 2.14.

The A.I. value obtained from the infrared absorption spectrum according to the method described in Japanese Patent Publn. (unexamined) No. 60974/1978 was 0.090. The heat absorption ratio according to the DSC (differential scanning calorimetry) method was 0.20, and the half value width of the heat absorption peak was 4.2 deg.

The PTFE fine powder (50 g) was admixed with a lubricant ("Isopar E") (10 g), and the resultant mixture was stored in a sealed vessel for 15 hours. The mixture was filled in an extrusion mold and extruded. The extrusion pressure in equilibrium was 190 kg/cm$^2$. The strand obtained by extrusion was dried and subjected to stretching test at 310° C. It could be stretched at pulling rates of 1000%/sec and of 100%/sec to make 30 folds. The apperances of the stretched products were uniform.

Since the polymerization time until 402 g of tetrafluoroethylene was consumed without addition of hydroquinone was 4.7 hours, the increase percentage of the polymerization time by addition of hydroquinone was 260%.

Comparative Example 1

Polymerization was carried out under the same conditions as in Example 1 except that the addition of hydroquinone was not made. The polymerization was continued until the amount of the finally produced polymer was 450 g. In the course of polymerization, sampling was made at the stage that the consumed amount of the monomer was 225 g. The polymerization time was 5.0 hours, and the average particle size of the produced polymer was 0.245 μm. The specific gravity of the sample taken in the course of polymerization was 2.195, and the specific gravity of the final product was 2.181. Thus, $\overline{M}ns/\overline{M}nc$ was 1.74. When subjected to stretching test, the strand was cut even at a pulling rate of 1000%/sec.

EXAMPLES 2 TO 5

In the same manner as in Example 1 but changing the amount of hydroquinone added and the stage of addition of hydroquinone, polymerization was carried out. The polymerization conditions, the polymerization results and the results of extrusion test and stretching test are shown in Table 1, wherein the increase percentage of the polymerization time was calculated with the results in Comparative Example 1. According to the DSC method, the obtained polymer showed a heat absorption ratio of 0.18 to 0.27 and a half value width of heat absorption peak of 4.3 to 5.0 deg.

In Example 4, the appearance of the product on stretching at a pulling rate of 100%/sec was not even, while that at a pulling rate of 1000%/sec was even.

Comparative Example 2

In the same manner as in Example 1, polymerization was carried out. But, hydroquinone was added to the polymerization system prior to the addition of APS, i.e. prior to the initiation of polymerization, in an amount of 2 ppm. APS was added in an amount of 10 mg, but no material consumption of tetrafluoroethylene was observed even after 1 hour. Then, 28 mg of APS was continuously added to the polymerization system in 30 minutes, whereby the polymerization could be initiated. The specific gravity of the core portions of the polymer particles was 2.214, and the specific gravity of the final polymer was 2.204. In the stretching test, the strand was cut even at a pulling rate of 1000%/sec.

Comparative Example 3

In the same manner as in Comparative Example 1, polymerization was carried out. But, the amount of hydroquinone was changed to 0.7 ppm. APS was added in an amount of 10 mg, but no material consumption of tetrafluoroethylene was observed even after 1 hour. Then, 10 mg of APS was additionally incorporated to force the proceeding of the polymerization. The specific gravity of the core portions of the polymer particles was 2.206, and the specific gravity of the final polymer was 2.185. In the stretching test, the strand was cut even at a pulling rate of 1000%/sec.

Comparative Examples 4 to 6

In the same manner as in Example 1, polymerization was carried out. But, the amount of hydroquinone added and the period of addition were varied. The polymerization conditions, the polymerization results and the results of extrusion test and stretching test are shown in Table 2.

EXAMPLE 6

In the same manner as in Example 1, polymerization was carried out. But, the polymerization temperature was 90° C., and the amount of APS added was 2 mg. The polymerization rate increased rapidly and then decreased quickly. Over the period from the stage at which 40 g of the monomer was consumed to the stage at which 180 g of the monomer was consumed, APS was continuously added to the polymerization system to make a total amount of 8 mg. Thereafter, the reaction was further continued without addition of APS until 400 g of the polymer was produced. In the course of polymerization, hydroquinone was added to the polymerization system at the stage that the consumed amount of the monomer reached 122 g. In the polymerization separately carried out without addition of hydroquinone, it took about 20 hours until 400 g of the polymer was produced. The results are shown in Table 3.

EXAMPLE 7

In the same manner as in Example 1 except that 3 mg of silver nitrate was added to the polymerization system simultaneously with addition of 10 mg of APS, polymerization was carried out. The stage at which hydroquinone was added and the final yield were as shown in Table 3. Although the particle size of the obtained PTFE fine powder was somewhat large, the stretchability was good. The results are shown in Table 3.

EXAMPLE 8

In the same manner as in Example 1 except that p-phenylenediamine was added to the polymerization system in place of hydroquinone in an amount of 2 ppm at the stage that the consumed amount of tetrafluoroethylene to the weight of the finally produced polymer reached 42%, polymerization was carried out. The stretchability was good. The results are shown in Table 3.

EXAMPLES 9 TO 11

In the same manner as in Example 1 except that instead of hydroquinone, pyrocatechol was used (Example 9), pyrogallol was used (Example 10) or p-benzoquinone was used (Example 11), polymerization was carried out. All the polymers obtained showed satisfactory stretchability over the level. The results are shown in Table 3.

Comparative Examples 7 to 9

In the same manner as in Example 1 except that instead of hydroquinone, ethylenediamine was used (Comparative Example 7), methanol was used (Comparative Example 8) or propionic acid was used (Comparative Example 9), polymerization was carried out. In Comparative Example 8, the amount of APS was lessened to 5 mg. All the strands were cut in the stretching test and had large specific gravities. In Comparative Examples 8 and 9, the increase percentage of the polymerization time was more than 30%. Since the molecular weight of the outer shell portions of the particles became small due to the effect of the chain transfer agent, the specific gravity of the final polymer was larger than that of the core portions. The results are shown in Table 4.

TABLE 1

| Example | Hydroquinone Amount (ppm) | Hydroquinone Stage added (%)[*1] | Yield of final PTFE (g) | Polymerization time (hrs) | Increase percentage of polymerization time (%) | Average particle size (μm) | Specific gravity at core portions | Specific gravity of final polymer | $\overline{Mn}_s/\overline{Mn}_c$ | Extrusion pressure (kgf/cm²) | Stretching test 1000%/sec | Stretching test 100%/sec |
|---|---|---|---|---|---|---|---|---|---|---|---|---|
| 1 | 2 | 42 | 402 | 12.0 | 260 | 0.249 | 2.191 | 2.171 | 2.14 | 190 | Even | Even |
| 2 | 2 | 18 | 402 | 16.0 | 340 | 0.280 | 2.189 | 2.170 | 2.07 | 180 | Even | Even |
| 3 | 4 | 42 | 406 | 12.3 | 260 | 0.272 | 2.192 | 2.171 | 2.21 | 191 | Even | Even |
| 4 | 4 | 65 | 448 | 9.0 | 180 | 0.220 | 2.196 | 2.176 | 2.14 | 203 | Even | Slightly uneven |
| 5 | 6 | 85 | 406 | 7.1 | 140 | 0.223 | 2.197 | 2.178 | 2.07 | 207 | Even | Uneven |

Note:
[*1]Indicated by the rate of the weight of consumed tetrafluoroethylene to the weight of final PTFE produced

TABLE 2

| Comparative Example | Hydroquinone Amount (ppm) | Hydroquinone Stage added (%)[*1] | Yield of final PTFE (g) | Polymerization time (hrs) | Increase percentage of polymerization time (%) | Average particle size (μm) | Specific gravity at core portions | Specific gravity of final polymer | $\overline{Mn}_s/\overline{Mn}_c$ | Extrusion pressure (kgf/cm²) | Stretching test 1000%/sec | Stretching test 100%/sec |
|---|---|---|---|---|---|---|---|---|---|---|---|---|
| 1 | 0 | — | 450 | 4.9 | — | 0.245 | 2.195 | 2.181 | 1.74 | 180 | Cut | Cut |
| 2 | 2 | 0 | 470 | 6.5 | — | 0.251 | 2.214 | 2.204 | 1.51 | 201 | Cut | Cut |
| 3 | 1 | 0 | 502 | 6.9 | — | 0.228 | 2.202 | 2.185 | 1.93 | 209 | Cut | Cut |
| 4 | 6 | 90 | 404 | 5.6 | 120 | 0.240 | 2.198 | 2.182 | 1.87 | 205 | Cut | Cut |
| 5 | 0.6 | 18 | 403 | 6.8 | 140 | 0.242 | 2.195 | 2.180 | 1.80 | 185 | Uneven | Cut |

TABLE 2-continued

| Comparative Example | Hydroquinone Amount (ppm) | Hydroquinone Stage added (%)*1 | Yield of final PTFE (g) | Polymerization time (hrs) | Increase percentage of polymerization time (%) | Average particle size (μm) | Specific gravity at core portions | Specific gravity of final polymer | M̄ns/M̄nc | Extrusion pressure (kgf/cm²) | Stretching test 1000%/sec | Stretching test 100%/sec |
|---|---|---|---|---|---|---|---|---|---|---|---|---|
| 6 | 0.6 | 42 | 433 | 5.4 | 110 | 0.253 | 2.195 | 2.179 | 1.87 | 189 | Uneven | Cut |

Note:
*1 Indicated by the rate of the weight of consumed tetrafluoroethylene to the weight of final PTFE produced

TABLE 3

| Example | Polymerization retarder Kind | Polymerization retarder Amount (ppm) | Stage added (%)*1 | Yield of final PTFE (g) | Polymerization time (hrs) | Increase percentage of polymerization time (%) | Average particle size (μm) | Specific gravity of final polymer | Extrusion pressure (kgf/cm²) | Stretching test 1000%/sec | Stretching test 100%/sec |
|---|---|---|---|---|---|---|---|---|---|---|---|
| 6 | Hydroquinone | 4 | 31 | 400 | 40.0 | 200 | 0.250 | 2.172 | 195 | Even | Uneven |
| 7 | Hydroquinone | 2 | 42 | 384 | 13.1 | 290 | 0.309 | 2.169 | 194 | Even | Even |
| 8 | p-Phenylenediamine | 2 | 42 | 395 | 23.4 | 520 | 0.259 | 2.168 | 213 | Even | Even |
| 9 | Pyrocatechol | 2 | 41 | 450 | 11.0 | 220 | 0.250 | 2.165 | 201 | Even | Even |
| 10 | Pyrogallol | 2.7 | 41 | 450 | 13.0 | 270 | 0.277 | 2.168 | 190 | Even | Even |
| 11 | p-Benzoquinone | 3 | 26 | 300 | 45.1 | 1400 | 0.273 | 2.175 | 189 | Even | Uneven |

Note:
*1 Indicated by the rate of the weight of consumed tetrafluoroethylene to the weight of final PTFE produced

TABLE 4

| Comparative Example | Additive Kind | Additive Amount (per 1.5 l water) | Stage added (%)*1 | Yield of final PTFE (g) | Polymerization time (hrs) | Increase percentage of polymerization time (%) | Average particle size (μm) | Specific gravity at core portions | Specific gravity of final polymer | M̄ns/M̄nc | Extrusion pressure (kgf/cm²) | Stretching test 1000%/sec | Stretching test 100%/sec |
|---|---|---|---|---|---|---|---|---|---|---|---|---|---|
| 7 | Ethylene | 12 mg | 53 | 448 | 5.3 | 95 | 0.237 | — | 2.177 | — | 189 | Cut | Cut |
| 8 | Methanol | 0.02 ml | 44 | 400 | 12 | 150 | 0.238 | 2.171 | 2.172 | 0.96 | 163 | Cut | Cut |
| 9 | Propionic acid | 0.08 ml | 42 | 390 | 15 | 350 | 0.240 | 2.173 | 2.177 | 0.83 | 160 | Cut | Cut |

Note:
*1 Indicated by the rate of the weight of consumed tetrafluoroethylene to the weight of final PTFE produced

What is claimed is:

1. A process for preparing polytetrafluoroethylene fine powder by polymerization of tetrafluoroethylene in an aqueous medium comprising a water-soluble polymerization initiator and a non-telogenic surfactant capable of keeping colloidal polytetrafluoroethylene particles at a sufficiently stable state, the process comprising effecting the polymerization at a temperature of 55° to 120° C., and incorporating into the aqueous medium a polymerization retarder selected from the group consisting of aromatic compounds having at least one substituent group selected from the group consisting of hydroxy and amino, and quinone compounds, said retarder having a water-solubility of not less than $2.5 \times 10^{-6}$ mol/liter at 25° C., a boiling point of from 94° to 241° C. and not having any reinitiation ability after its addition or chain transfer to a free radical in the polymerization system, said retarder being incorporated into the aqueous medium in an amount of 0.7 to 20 ppm at the stage after the initiation of the polymerization and after the consumption of at least 10% by weight of tetrafluoroethylene to be polymerized but before the consumption of 85% by weight of tetrafluoroethylene to be polymerized so that the polymerization time is extended at least 130% in comparison with that of the case wherein the polymerization is effected under the same conditions as above except not using the polymerization retarder, whereby colloidal polytetrafluoroethylene particles, of which the core portions occupying 50% by weight of the total weight of the finally produced particles have a specific gravity of not more than 2.210, of which the specific gravity of the finally produced particles is not more than that of the core portions and of which the average particle size is 0.1 to 0.5 μm, are obtained.

2. The process according to claim 1, wherein said aromatic compound is selected from the group consisting of phenol, naphthols, nitrophenols, p-nitrosophenol, aminophenols, polyhydric phenols, salicylic acids, gallic acid, phenylenedimines and benzidine.

3. The process according to claim 1, wherein said quinone compound is selected from the group consisting of benzoquinones, naphthoquinones and alizarin.

4. The process according to claim 1, wherein the polymerization temperature is from 60° to 90° C.

5. The process according to claim 1, wherein the polymerization initiator is ammonium persulfate or alkali metal persulfate.

6. The process according to claim 5, wherein the polymerization initiator is used in an amount of not more than 0.004% by weight on the basis of the weight of the aqueous medium.

* * * * *